United States Patent Office 3,426,086
Patented Feb. 4, 1969

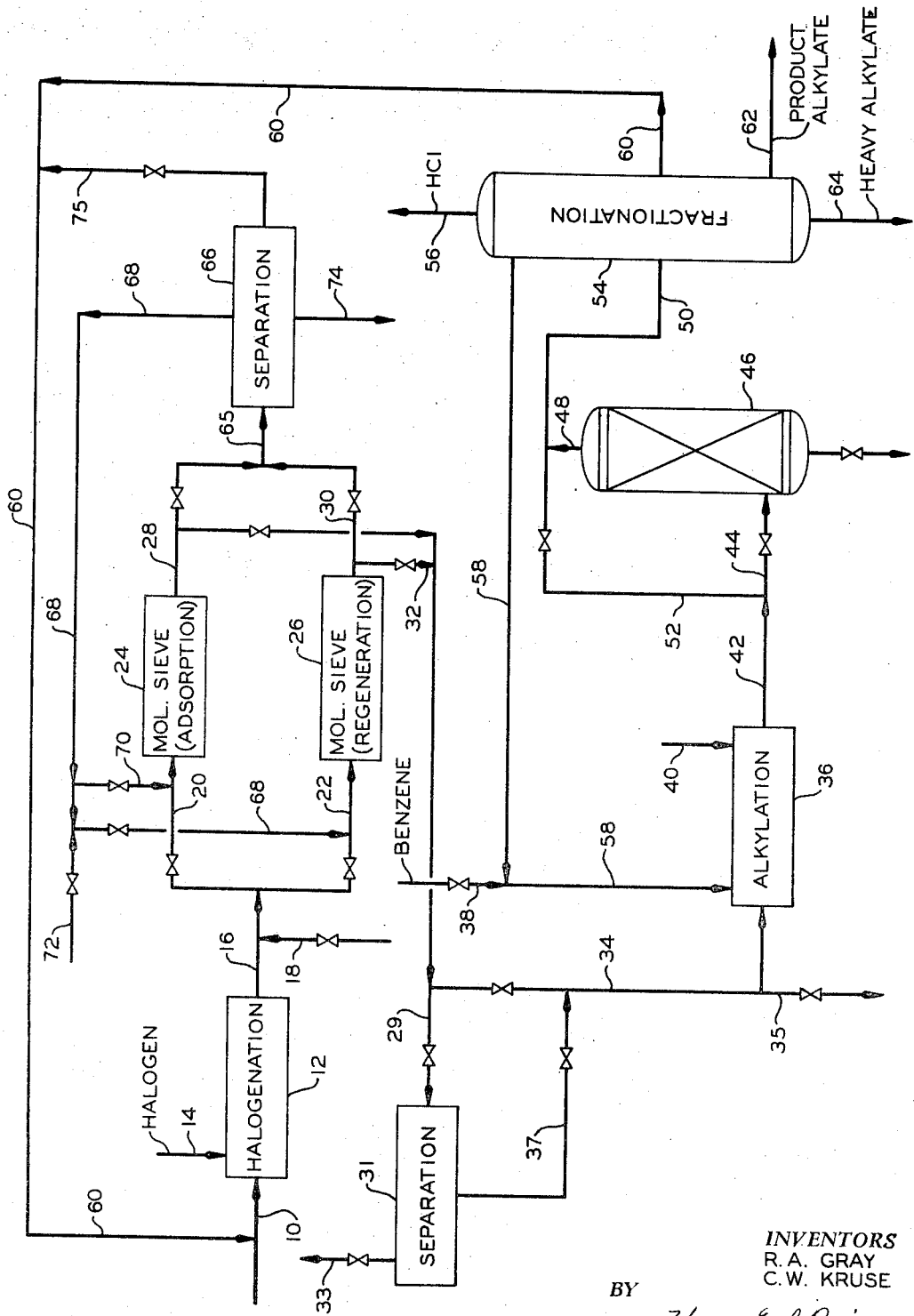

3,426,086
PRODUCTION AND/OR RECOVERY OF
PRIMARY HALOALKANES
Roy A. Gray and Carl W. Kruse, Bartlesville, Okla., assignors to Phillips Petroleum Company, a corporation of Delaware
Filed Jan. 4, 1965, Ser. No. 423,212
U.S. Cl. 260—652
Int. Cl. C07c 7/02, 7/12, 21/00
5 Claims

ABSTRACT OF THE DISCLOSURE

Primary haloalkanes are separated from mixtures of same with secondary and/or tertiary haloalkanes by contacting said mixtures with a molecular sieve adsorbent to selectively adsorb said primary haloalkanes.

---

This invention relates to the production and/or recovery of primary haloalkanes. In one aspect this invention relates to the separation of primary haloalkanes from mixtures containing the same together with secondary and/or tertiary haloalkanes. In another aspect this invention relates to the production of an improved detergent grade alkylate.

Haloalkanes, and particularly primary haloalkanes, are valuable starting materials for a number of other valuable materials such as alcohols, amines, and the like. Primary haloalkanes in high purity can be utilized to produce primary alcohols, primary amines, and the like of high purity and in high yield.

A wide variety of processes are available for the production of haloalkanes. Many of these processes involve the halogenation of paraffinic hydrocarbons in the presence or absence of ultraviolet light. Such processes yield mixtures of mono- and polyhalo compounds, with the monohalo compounds being a mixture of primary, secondary, and tertiary halides. If n-paraffins are employed as starting materials, no tertiary halides will be present in the yield mixture. However, because of the greater number of secondary carbon atoms present in the paraffinic hydrocarbons, the amount of secondary monohalides present in the yield mixture will, of course, be much greater than the amount of primary monohalides. For example, in halogenating a paraffin hydrocarbon such as n-dodecane which contains 20 secondary hydrogen atoms and 6 primary hydrogen atoms the statistical probabilities involved cause the production of a mixture of primary and secondary haloalkanes in which the secondary haloalkanes predominate.

In the production of the chemicals, such as primary alcohols, primary amines, etc., from these halogenated paraffins, it would be advantageous if the secondary halides were not present. Thus, if a method could be developed for separating said mixtures so as to obtain the primary halides in high purity, it would greatly facilitate the conversion of such halides to other valuable chemicals such as primary alcohols and the like in high purity. However, such separations are very difficult, particularly when a mixture of paraffinic hydrocarbons derived from kerosene is subjected to halogenation. Such halogenated mixtures contain halogenated materials of such close boiling points that it is difficult, if not practically impossible, to separate the individual compounds by inexpensive methods such as distillation.

Said primary haloalkanes also present problems in the manufacture of detergent grade alkylates. One method for the production of a large class of detergents comprises the alkylation of certain aromatic hydrocarbons with haloalkanes to produce an alkylate comprised principally of monoalkyl aromatics which are subsequently sulfonated. The alkylation step is commonly carried out in the presence of an aluminum chloride-hydrocarbon complex catalyst and a hydrogen chloride promoter therefor, or in the presence of a hydrogen fluoride catalyst. In such alkylation processes, the reaction rate of the secondary and tertiary haloalkanes with the aromatic compound is much greater than the reaction rate of the primary haloalkanes. The activity level of the catalysts which is necessary to obtain essentially complete reaction of primary haloalkanes is much higher than that necessary to obtain essentially complete alkylation of secondary and/or tertiary haloalkanes. Consequently, there very frequently is some primary haloalkane, in small but significant amounts, which remains unreacted. In commercial operations employing commercial fractionation and other separation techniques, some of this unreacted primary haloalkane usually ends up in the product alkylate as an impurity. This is undesirable because said impurity is usually carried on through the system and ends up in the detergent end product.

The present invention provides a solution for the above-described problems. Broadly speaking, according to the process of this invention, primary haloalkanes are separated from mixtures containing the same together with secondary and/or tertiary haloalkanes by contacting said mixtures in a contacting zone with a crystalline zeolitic molecular sieve material which is selective for the adsorption of primary haloalkanes. The adsorbed primary haloalkanes can be desorbed from said molecular sieve material by elution with a primary haloalkane having a lower molecular weight than said adsorbed primary haloalkane, and recovered as high purity primary haloalkane which is eminently suitable for the manufacture of high purity primary alcohols, etc., as described above. Furthermore, the treated mixture recovered from said contacting zone has at least a substantially reduced primary haloalkane content and is eminently suitable for the manufacture of high purity, high grade detergents as described above.

Thus, an object of this invention is to provide a process for the production and/or recovery of primary haloalkanes. Another object of this invention is to provide a process for separating primary haloalkanes from mixtures containing the same and also containing secondary and/or tertiary haloalkanes. Another object of this invention is to provide a process for the production of a high purity detergent grade alkylate. Other aspects, objects, and advantages of the invention will be apparent to those skilled in the art in view of this disclosure.

Thus, according to the invention, there is provided a process for the selective removal of straight chain primary haloalkane from a mixture comprising said primary haloalkane and at least one other haloalkane selected from the group consisting of secondary haloalkanes, tertiary haloalkanes, and mixtures thereof, which process comprises: contacting said mixture in a contacting zone with a crystalline zeolitic molecular sieve material capable of selectively adsorbing said primary haloalkane; and recovering unadsorbed haloalkane comprising said other haloalkane and having at least a substantially reduced primary haloalkane content from said contacting zone. It will be understood that herein and in the claims, unless otherwise specified, the terms "primary haloalkane" and "primary alkyl halide" refer to straight chain primary haloalkanes and straight chain primary alkyl halides, respectively.

The process of this invention is particularly suitable for the separation of straight chain primary monohaloalkanes from secondary and/or tertiary monohaloalkanes having the same or substantially the same number of carbon atoms per molecule. The process is most suited for the separation of said haloalkanes which contain at least 8 carbon atoms per molecule. While the process of this invention can be employed for the separation of said haloalkanes broadly, it is most suited for the separation of chloroalkanes and bromoalkanes. The invention is also particularly suited for the separation of straight chain primary haloalkanes from secondary and/or tertiary haloalkanes containing from 10 to 15 carbon atoms per molecule to remove at least a major portion of the primary haloalkanes, and then utilizing the resulting treated mixture comprising secondary and/or tertiary haloalkanes in the manufacture of high purity detergent grade alkylates as described herein.

Thus, in accordance with another aspect of the invention, there is provided a process for the production of an improved detergent grade alkylate and the production of a high purity straight chain primary haloalkane, which process comprises, in combination, the steps of: halogenating paraffinic hydrocarbons containing from 10 to 15 carbon atoms per molecule with a halogenating agent in a halogenation zone under halogenation conditions to produce a mixture of halogenated and nonhalogenated hydrocarbons; passing said mixture to a contacting zone and therein contacting same with a crystalline zeolitic molecular sieve material having pore diameters of about 5 Angstroms; in said adsorption zone, selectively adsorbing at least the major portion of the primary haloalkanes into said molecular sieve material; withdrawing a treated mixture having a substantially reduced primary haloalkane content from said contacting zone; continuing said contacting in said adsorption zone until said molecular sieve material is spent; thereafter regenerating said molecular sieve material by contacting same with an eluent consisting essentially of a primary haloalkane having a molecular weight lower than the primary haloalkanes adsorbed by said molecular sieve material so as to desorb said adsorbed primary haloalkanes; passing said desorbed primary haloalkanes and said eluent to a separation zone; in said separation zone, effecting a separation between said desorbed primary haloalkanes and said eluent and also between said desorbed primary haloalkanes and any paraffinic hydrocarbon which may be present; withdrawing said desorbed primary haloalkanes from said separation zone as one product of said process; passing said withdrawn treated mixture from said contacting zone to an alkylation zone; passing benzene into said alkylation zone; in said alkylation zone, alkylating said benzene with the remaining haloalkanes in said treated mixture under alkylation conditions in the presence of an alkylation catalyst active for alkylating benzene with said haloalkanes to form an alkylate stream; passing said alkylate stream to a fractionation zone and therein separating same into a stream of nonhalogenated hydrocarbons, a stream of unreacted benzene, a product alkylate stream, and a heavy alkylate stream; and withdrawing said product alkylate stream from said fractionation zone as another product of the process.

Haloalkanes which can be separated according to the process of this invention are the monochloroalkanes and monobromoalkanes containing from 3 to 25 carbon atoms per molecule. While there is actually no upper limit on the number of carbon atoms in said haloalkanes, the haloalkanes containing more than 20 carbon atoms per molecule are not often utilized in the practice of the invention because of their higher boiling points. When it is desired to also produce a detergent grade alkylate, as discussed further hereinafter, the haloalkanes will preferably contain a more restricted range of carbon atoms per molecule, e.g., 10 to 15 or 10 to 13, depending upon the properties desired in the detergent. Examples of primary haloalkanes which can be separated from secondary and/or tertiary haloalkanes in the practice of the invention include, among others, the following: n-propyl chloride; n-pentyl chloride; n-octyl bromide; n-decyl chloride; n-pentadecyl chloride; n-eicosyl chloride; n-pentaeicosyl chloride; and the like. Examples of other haloalkanes which can be associated with said primary haloalkanes in mixtures to be separated in accordance with the invention include, isopropyl bromide; 2-methylbutyl chloride; 2,4,4-trimethylheptyl chloride; 2 - ethyl - 3,4,5 - trimethyldecyl chloride; 2,4-diethylhexadecyl bromide; tert-butyl chloride; 1,1-dimethylnonyl bromide; 1,1-diethylhexadecyl chloride; and other secondary and tertiary haloalkanes, including those corresponding to the above-named primary haloalkanes.

The mixtures of primary and secondary and/or tertiary haloalkanes which can be separated in accordance with the invention can vary widely in composition. For example, mixtures containing from about 5 to about 95 weight percent of primary haloalkane and from about 95 to about 5 weight percent of secondary and/or tertiary haloalkanes can be separated by the process of this invention. The separation in accordance with the invention can be carried out batchwise or continuously, employing single or multiple adsorption stages, depending upon the composition of the starting mixture to be separated and the desired degree of separation.

An inert diluent can be employed in admixture with the mixture of haloalkanes, if desired. If a diluent is employed the amount thereof can range from 0 to about 90 weight percent of the diluent-haloalkane mixture. Any suitable diluent which will not interfere with the separation to be effected can be employed in the practice of the invention. Suitable diluents include, for example, normal paraffins containing from 5 to 20 carbon atoms per molecule, cyclopentane, cyclohexane, isooctane, benzene, toluene, and the like. The choice of the particular diluent employed will depend upon the particular haloalkanes being separated, as one would choose a diluent having a boiling point sufficiently different from said haloalkanes so as to facilitate the separation of said diluent and the unadsorbed haloalkane.

The adsorption or molecular sieve materials applicable in the present invention are the various naturally occurring zeolites or synthetic zeolites capable of selectively adsorbing primary haloalkanes from admixture with secondary and/or tertiary haloalkanes. Presently preferred molecular sieve materials are those having a pore diameter of about 5 Angstroms. Applicable materials are the various crystalline alumino-silicates which have been heated to remove water of hydration. The adsorbent materials may be prepared by any of the well known methods in the art. Of the three classes of crystalline zeolites, fibrous, laminar, and rigid three-dimensional anionic networks, the last-mentioned class only is suitable in our invention. Examples of such materials include chabazite, phacolite, gmelinite, harmotone, mordenite, and the like, or suitable modifications thereof, produced by base exchange. The literature contains many references to the composition and adsorbing action of molecular sieves. Generally speaking, molecular sieves are alkali metal or alkaline earth metal alumino-silicates and can be either natural or synthetic in origin. Said materials have large numbers of submicroscopic cavities interconnected by many smaller pores or channels which are extremely uniform in size. In operation, the generally accepted explanation for the action of the molecular sieves is that adsorption takes place within said pores, and only those materials having molecular diameters small enough to enter said pores are retained by the zeolite. Hence, the name molecular sieves. A presently preferred molecular sieve material, and the one employed in the examples given hereinafter, is known in the art as Linde Type 5A. The molecular sieve materials can be employed in granular form, such as $\frac{1}{16}$ to $\frac{1}{4}$-inch pellets, or in finely divided form, such as up to about 200 mesh. Contacting of the hydrocarbon fractions with the molecular sieve materials can be carried out in any suitable zone, such as a fixed bed, moving bed, or the like. It is also within the scope of the invention to form a slurry of the molecular sieve material and the material being treated, and following the adsorption to separate the unadsorbed haloalkanes from the mol sieve material by filtration, decantation, etc.

The process conditions employed for contacting the haloalkane-containing hydrocarbon fractions with the molecular sieve materials in accordance with the invention can vary considerably depending upon the concentration of haloalkane material in the mixture to be treated, the desired degree of removal of said haloalkane, and other variables. The contacting temperature employed will usually be within the range of from about 0 to about 100° C., preferably about 20 to about 80° C. The contacting pressure is not critical and can be within the range of from atmospheric to about 600 p.s.i.g. Generally speaking, the contacting pressure employed is preferably sufficient to maintain the mixtures being contacted in liquid phase and sufficient to provide for normal pressure drops through the bed when a fixed bed is employed. However, it is within the scope of the invention to carry out said contacting under conditions of temperature and pressure such that the mixture being contacted with the molecular sieve is in vapor phase. Said contacting can be carried out at contact times ranging from a few minutes to several days, e.g., 1 or 2 minutes to 72 hours, employing weight ratios of haloalkanes to molecular sieve within the range of 1:10 to 1:1, although ratios outside this range can be employed.

The molecular sieve adsorbent materials employed in the practice of the invention can be regenerated in any suitable manner by contacting same with an eluent consisting essentially of a primary haloalkane having a lower molecular weight than the haloalkane adsorbed on said molecular sieve material. Preferably, said eluent will contain the same type of halogen atom as the adsorbed haloalkane. Elution is generally effected at a temperature within the range of from about 25 to about 175° C. at an eluent to sieve weight ratio within the range of from about 1:1 to 5:1. The time of the elution will be within the range of time set forth above for the adsorption step. The mixture of eluent and desorbed haloalkane can then be separated by distillation or other suitable means. Clearly, if one employs distillation to separate the eluent and the desorbed haloalkane, one will want to choose an eluent having a boiling point sufficiently different from that of said desorbed haloalkane to facilitate said separation.

Any suitable alkylation catalyst can be employed in the alkylation step of the invention. Examples of suitable catalysts include aluminum chloride-hydrocarbon complex, and hydrogen fluoride. Said hydrogen fluoride is preferably anhydrous or essentially anhydrous. However, said hydrogen fluoride catalyst can contain up to about 5 percent water by volume.

It is well known that aluminum chloride forms a complex or complexes with hydrocarbons and said complex or complexes have catalytic properties. The chemistry of aluminum chloride catalysis of hydrocarbon conversions is not completely understood. It is presently believed by those skilled in the art that aluminum chloride per se and aluminum chloride-hydrocarbon complexes both exert catalytic activities in said conversions. Thus, herein and in the claims, unless otherwise specified, the term "aluminum chloride catalyst" is employed generically to include both aluminum chloride and aluminum chloride-hydrocarbon complexes.

Referring now to the drawing, the invention will be more fully explained. Said drawing is a schematic flow sheet illustrating various embodiments of the invention. It will be understood that many pumps, valves, condensers, etc. have been omitted as not being necessary to explain the invention to those skilled in the art and to simplify said drawing. In the process illustrated in said drawing, a suitable hydrocarbon mixture comprising predominantly normal paraffinic and isoparaffinic hydrocarbons of suitable boiling range, such as a $C_{10}$ to $C_{15}$ or a $C_{10}$ to $C_{13}$ fraction, is introduced via conduit 10 into photochemical halogenation zone 12 wherein it is contacted in the presence of light with a halogenating agent introduced via conduit 14. Usually the hydrocarbon fraction introduced into halogenation zone 12 will preferably contain a high percentage of normal paraffinic hydrocarbons so as to eliminate or minimize the formation of tertiary haloalkanes. Such a fraction can be obtained by contacting kerosene with a suitable molecular sieve. If desired, the hydrocarbon introduced via conduit 10 can be a pure or essentially pure paraffinic hydrocarbon.

Chlorine and bromine are the preferred halogenating agents, with chlorine being the presently most preferred halogenating agent. Any suitable halogenation conditions can be employed in said halogenation zone but it is preferred to select conditions which provide about 15 to 25, preferably about 20 percent conversion of the hydrocarbons to halogenated hydrocarbons per pass. Said conditions will usually include a temperature within the range of from about 0 to about 100° F., preferably about 20 to about 50° F., a pressure within the range of from about 20 to about 100 p.s.i., preferably about 30 to about 50 p.s.i., and a reaction time within the range of about 8 to about 20 seconds. It will be understood that said conditions are interrelated and variation in one condition will be accompanied by variation in one or more of the other conditions. For example, when using the preferred halogenating agent (chlorine), pressure is employed to maintain the hydrocarbon in liquid phase (if necessary) and also to increase the solubility of gaseous chlorine in said hydrocarbons. The amount of pressure actually employed will depend upon the hydrocarbons present, the temperature, and the desired conversion level. With respect to temperature, higher temperatures favor the formation of dichlorides which is undesirable. Higher conversion rates also favor the formation of dichlorides. It is preferred to select conditions such that the ratio of monochlorides to dichlorides is within the range of from 4:1 to 30:1, preferably 7:1 to 12:1, more preferably about 9:1. The chlorination reaction is a photochemical reaction and is carried out by dissolving the chlorine in the hydrocarbon and then exposing the resulting mixture or solution to ultraviolet light under time, temperature, and pressure conditions within the ranges set forth above.

It is to be understood that the invention is not limited to employing photochemical halogenation in the halogenation step. Haloalkanes prepared by any other suitable halogenation method such as thermal and catalytic methods can be employed in the practice of the invention. Halogenating agents in addition to those mentioned above which can be employed include sulfuryl chloride, sulfuryl bromide, thionyl chloride, and thionyl bromide. Halogenation catalysts which can be employed include ferric chloride, antimony chloride, sulfur chloride, iodoform, benzoyl peroxide and others. It should also be understood that it is within the scope of the invention to introduce pure or substantially pure halohydrocarbons from any source into the system via conduit 18, instead of or in addition to the halohydrocarbons from conduit 16.

A mixture of halogenated and nonhalogenated hydrocarbons is withdrawn from halogenation zone 12 via conduit 16 and passed via conduit 20 into contacting zone 24 wherein it is contacted with a molecular sieve adsorbent having a pore diameter of about 5 Angstroms, which adsorbs at least the major portion of the primary haloalkanes contained in said mixture, thereby producing a treated mixture having at least a substantially reduced primary haloalkane content. Said treated mixture is withdrawn from contacting zone 24 via conduit 28 and passed into conduit 34 for use as described hereinafter.

It will be understood that contacting zones 24 and 26, here shown to be adsorption and regeneration zones respectively, are employed in conventional onstream-offstream operations by means of the manifolding shown. Thus, when the molecular sieve adsorbent in contacting or adsorption zone 24 has become spent, i.e., it will no longer adsorb primary haloalkanes, the hydrocarbon stream in conduit 16 is switched from conduit 20 into conduit 22 and passed into contacting zone 26 which now becomes the onstream adsorption zone. Treated mixture from said contacting zone 26 is withdrawn therefrom via conduits 30 and 32 and passed into conduit 34 for use as described hereinafter. If desired, depending upon the composition of the original mixture in conduit 16 and the degree of separation effected in said contacting zones 24 and 26, said stream in conduit 34 can be passed via conduit 35 to storage for utilization as a source of secondary haloalkanes.

After the treated stream has been switched from contacting zone 24 to contacting zone 26, a stream of a suitable eluent such as described above is passed via conduits 68 and 70 into conduit 20 for introduction into said contacting zone 24. Said eluent contacts the used or spent absorbent in contacting zone 24 and desorbs or removes the adsorbed straight chain primary haloalkanes therefrom. Desorbed straight chain primary haloalkanes, together with said eluent, are removed from contacting zone 24 via conduit 28 and passed via conduit 65 into separation zone 66 where a separation between said eluent and said haloalkanes is effected. The thus desorbed primary haloalkanes can be withdrawn from separation zone 66 via conduit 74 as one product of the process as previously described. Make-up eluent can be added to the system when necessary via conduit 72. It will be understood that said separation zone 66 can comprise suitable distillation and fractionation means or other suitable means for effecting a liquid-liquid separation. It will be understood by those skilled in the art that when adsorbent in contacting zone 26 becomes spent, the stream in conduit 16 is switched back to conduit 20 and the adsorbent in contacting zone 26 is then regenerated in the same manner as previously described for said contacting zone 24.

When the mixture being treated in one of said contacting zones 24 and 26 consists essentially of straight chain primary haloalkanes and secondary haloalkanes (as can be introduced via conduit 18) the treated stream in conduits 28 or 32 will consist essentially of secondary haloalkanes of high purity, and the desorbed stream recovered via conduit 74 will consist essentially of straight chain primary haloalkanes of high purity. When, however, said mixture being treated also comprises normal paraffins (as can be present in conduit 16 from zone 12), said desorbed stream in conduits 28 or 30 may also contain normal paraffins, and under such conditions said stream recovered from separation zone 66 via conduit 74 may also contain normal paraffins. This, however, presents no great problem in the practice of the invention because, as discussed below, it occurs only when new adsorbent or sieve material is being used, and also, the desorbed straight chain primary haloalkanes passed via conduit 65 to separation zone 66 during elution can be readily separated from any normal paraffins associated therewith by conventional methods such as solvent extraction, fractional crystallization, or distillation (depending upon the boiling points). Suitable solvents which can be employed in said solvent extraction include liquid sulfur dioxide, dimethylformamide, and others.

Thus, in the practice of the invention, it will be undestood that separation zone 66 can comprise, in addition to means for separating eluent from straight chain primary haloalkane, means for separating said primary haloalkane from any normal paraffin which may be associated therewith. In such instances, said normal paraffin would be removed from said separation zone 66 via conduit 75 and introduced into conduit 60 for recycle to halogenation zone 12.

When one of contacting zones 24 or 26 has been regenerated by elution with a straight chain primary haloalkane of lower molecular weight than the straight chain primary haloalkane adsorbed during the adsorption cycle as discussed above, the pores in the molecular sieve will be loaded with said lower molecular weight haloalkane. When one of said regenerated zones is returned to the adsorption cycle by admitting feed from conduit 20 or 22, the higher molecular weight straight chain primary haloalkane in said feed will displace said lower molecular weight haloalkane from said sieve pores. However, any normal paraffin in said feed will not displace said lower molecular weight primary haloalkane and will not be adsorbed. Thus, in continuous operations, or when one is employing a sieve which has been previously eluted with a said lower molecular weight straight chain primary haloalkane, the desorbed straight chain primary haloalkane passed via conduit 65 to separation zone 66 will not contain normal paraffin. However, the first material passing through one of said conduits 28 or 32 to conduit 34 after one of said contacting zones has been returned to the adsorption cycle will contain some of said lower molecular weight haloalkane as a diluent. Since this diluent material will boil substantially below any unadsorbed paraffins which may be present and also below the unadsorbed secondary haloalkanes, it can be readily separated by simple fractionation. Thus, in the practice of the invention, this can be accomplished by passing the stream in conduit 34 to separation zone 31 via conduit 29. Said lower molecular weight haloalkane can be removed from said separation zone 31 via conduit 33 and passed into eluent feed conduit 68 for recycle to one of said contacting zones 24 or 26. The bottoms from the distillation can be returned to conduit 34 via conduit 37 for use as described hereinafter.

In one presently preferred embodiment of the invention, the treated stream in conduit 34 is passed into alkylation zone 36. A suitable alkylation catalyst, such as aluminum chloride and/or aluminum chloride-hydrocarbon complex is introduced into alkylation zone 36 via conduit 40. A suitable alkylatable hydrocarbon is introduced into zone 36 via conduit 58. The process is applicable to the alkylation of benzene, toluene, xylene, and the like and is particularly applicable to the alkylation of benzene (the preferred aromatic hydrocarbon) with the halogenated n-paraffinic and isoparaffinic hydrocarbons containing from 10 to 15 carbon atoms. In some instances high aromatic content naphtha fractions boiling within the range of from about 175 to about 300° F., such as can be obtained from thermally cracked naphthas, can be employed as a source of alkylatable aromatic hydrocarbon. A particularly desirable catalyst is the complex of hydrocarbon with aluminum chloride. In addition to the catalyst it is desirable that the corresponding hydrogen halide be present in the reaction zone since this material maintains catalyst activity at a high level. The reaction rate and the conversion of the hydrocarbon feed is dependent on the amount of aluminum chloride in the aluminum chloride-hydrocarbon complex. However, the quantity of aluminum chloride in the complex can be varied over wide ranges to provide a corresponding range of feed reactant conversion. While the over-all activity of the catalyst is established by the aluminum chloride content, as stated, the presence of hydrogen chloride is required to provide a high activity. Usually the quantity of hydrogen chloride present is between about 0.5 and about 6 weight percent of the feed with about 2 to 4 weight percent being preferred. It is usually not necessary to add additional hydrogen chloride because the hydrocarbon charge will contain HCl liberated in the previous chlorination step. Also, HCl is liberated in the alkylation reaction.

The aluminum chloride-hydrocarbon complex catalyst can be originally prepared by mixing aluminum chloride and kerosene in a weight ratio of about 8:5. During operation of the process, the original complex catalyst is replaced with complex catalyst formed in the process. During operation of the process the heat of hydrolysis of the catalyst phase is usually in the range of 140 to 160 calories per gram. However, catalysts having higher heats of hydrolysis in the order of 300 to 325 calories per gram, e.g., new catalysts, can also be employed in the practice of the invention. It is also within the scope of the invention to employ catalysts having heats of hydrolysis less than 140 calories per gram, e.g., 100 to 139 calories per gram. Thus, the over-all range of catalysts which can be employed in the practice of the invention are those having a heat of hydrolysis within the range of from 100 to 325 calories per gram.

The conditions employed in alkylation zone 36 will depend upon the catalyst employed, the aromatic hydrocarbon to be alkylated, and the boiling points of the haloalkanes. As will be understood by those skilled in the art, said conditions are interrelated. When employing the above-described aluminum chloride catalysts, the alkylation will generally be carried out at a temperature within the range of from 50 to 110° F. with a pressure sufficient to maintain liquid phase conditions and to prevent vaporization of catalyst. When employing the above-described hydrogen fluoride catalysts, the alkylation will generally be carried out at a temperature within the range of from 32 to 220, preferably from about 75 to about 220° F. Pressure is not critical and will usually be autogenous at less than 500 p.s.i. When operating in a continuous system, flow rates of reactants with either catalyst should be maintained such that the residence or contact time in the contactor or reaction zone is within the range of from about 10 minutes to about 30 minutes, preferably from about 10 to about 20 minutes.

The ratio of the total reactants fed to the reactor or alkylation zone, i.e., the sum of the aromatic hydrocarbon plus the mixture of haloalkanes, to the catalyst will usually be within the range of from about 1:5 to 4:1, preferably about 2:1, for the aluminum chloride catalyst, and from about 0.5:1 to 5:1 for the hydrogen fluoride catalyst, all on a volume basis. The mol ratio of the aromatic hydrocarbon to the haloalkanes entering the alkylation zone should be such as to furnish at least one mol of aromatic hydrocarbon, e.g., benzene, per gram atom of halogen on the haloalkanes. It is preferred to operate with an excess of aromatic hydrocarbon. Thus, the mol ratio of the aromatic hydrocarbon to the haloalkanes can vary over a wide range but will generally be maintained within the range of from about 2:1 to 30:1, preferably from 8:1 to 15:1 for the aluminum chloride catalyst, and from 1.5:1 to 25:1, preferably from 5:1 to 20:1 for the hydrogen fluoride catalyst.

It will be understood that alkylation zone 36 includes, in addition to a suitable contactor or reactor for carrying out the alkylation reaction, a separation vessel or zone wherein a hydrocarbon phase is separated from the catalyst phase which is returned to said contactor or reactor. Said hydrocarbon phase is withdrawn from zone 36 via conduit 42 and passed via conduit 44 into the lower portion of coalescer 46 for removal of entrained catalyst. Said coalescer 46 can comprise any suitable type of vessel and conveniently comprises an upright tower containing a bed of any suitable contacting material such as porcelain saddles, Raschig rings, gravel, anthracite coal, etc. Coalesced and separated catalyst is withdrawn from the bottom of vessel 46 via the conduit shown. Hydrocarbon phase is withdrawn from said coalescer via conduit 48. In some instances where the amount of entrained catalyst in the hydrocarbon stream in conduit 42 is negligibly small, said hydrocarbon stream can be passed around said coalescer via conduit 52 and introduced into conduit 50.

The hydrocarbon stream in conduit 50 is then introduced into fractionation zone 54. Said fractionation zone 54 can comprise any suitable number of conventional strippers and/or fractionators for making the indicated desired separations. An overhead fraction comprised principally of hydrogen chloride gas is withdrawn from said zone 54 via conduit 56. Said hydrogen chloride gas, with or without additional drying and/or other purification as may be necessary, can be passed to compression as a product of the process. If necessary or desirable a portion or all of said hydrogen chloride stream in conduit 56 can be returned to the alkylation zone.

A fraction comprising nonhalogenated hydrocarbons is withdrawn from said fractionation zone 54 via conduit 60 and passed into conduit 10 for recycle to said halogenation zone 12. Another fraction comprising benzene is withdrawn from said fractionation zone 54 via conduit 58 for recycle to said alkylation zone 36. A bottoms or heavy alkylate stream withdrawn from said fractionation zone 54 via conduit 64 comprises a high molecular weight, high density material and can be utilized as a high density fuel stock. A product alkylate of high purity detergent grade is withdrawn via conduit 62 as another product of the process.

Said product alkylate withdrawn via conduit 62 is a valuable material which can be sulfonated in known manner for the production of valuable detergents. Thus, the process of the invention not only produces valuable primary haloalkanes as one product of the process but also produces an alkylate which is a valuable raw material for the production of valuable detergents.

The following examples will serve to further illustrate the invention. In said examples, the term "GLC" refers to gas liquid chromatography.

EXAMPLE I

A run was carried out in which a mixture of 1-chlorododecane and 2-chlorododecane was contacted with 5A molecular sieve. In this run, a mixture consisting essentially of 61.15 weight percent 2-chlorododecane and 38.85 weight percent 1-chlorododecane was added to about 50 grams of 5A molecular sieve until liquid covered all of the sieve. After standing at room temperature overnight, the liquid above the sieve was sampled and analyzed by GLC. The GLC analysis indicated that the liquid contained 69.30 weight percent 2-chlorododecane and 30.70 weight percent 1-chlorododecane. This shows that 1-chlorododecane is being adsorbed more rapidly than the 2-chlorododecane.

It was attempted to elute the adsorbed 1-chlorododecane from the molecular sieve with n-hexane. Four washes at room temperature did not remove the adsorbed halides, so the temperature was raised to reflux temperature and n-hexane was refluxed over the sieve for 4 hours. No removal of the 1-chlorododecane was effected.

The molecular sieve was then drained free of liquid and charged to a flask fitted with a Dry Ice trap and a vacuum pump. At about 0.5 mm. Hg. absolute pressure, the flask was heated in a water bath to approximately 100° C., yielding 22 ml. liquid in the trap. GLC analysis of the liquid in the trap indicated that this material was all n-hexane, and no dodecyl chloride was present.

EXAMPLE II

A mixture comprising 12.2 grams of 2-chlorododecane, 7.8 grams of 1-chlorododecane and 87 grams of cyclopentane was added to 100 grams of 5A molecular sieve at 25° C. The liquid-sieve mixture was then warmed to about 30–35° C., and a small amount of gas was evolved. After standing overnight, GLC analysis showed that all of the 1-chlorododecane had been removed from the liquid above the sieve. The molecular sieve was filtered off, washed with cyclopentane, then placed in an extraction thimble, and extracted with n-hexane in a Soxhlet extractor. After 4 hours, the extract was analyzed by GLC, and no evidence of eluted 1-chlorododecane was found. Continued extraction with n-nonane for 4 hours at 120° C. still gave no indication of elution of 1-chlorododecane from the sieve. The sieve was again drained and the nonane extractant was replaced with n-tridecane. The loaded sieve was extracted for 2 hours with n-tridecane at refluxing temperature (about 165° C.). Again, there was no evidence of 1-chlorododecane being extracted. Extraction was continued, and the liquid in the thimble was heated with a heat gun to a temperature of about 210 to 220° C. for about 2 hours. There was still no evidence of 1-chlorododecane being removed from the sieve.

EXAMPLE III

A run was carried out to determine if a lower molecular weight haloalkane, 1-chloropentane, could be eluted from a molecular sieve with a n-paraffin.

In this run, a mixture of 20 grams of 1-chloropentane and 80 grams of toluene was added to a 100 gram portion of 5A molecular sieve. After 4 hours, the liquid over the sieve was analyzed by GLC, and it was found that about 70 percent of the 1-chloropentane had been adsorbed. The sieve was then drained and placed in a flask with n-nonane. A condenser was placed on the neck of the flask, and the sieve-nonane mixture was heated to 120° C. At the end of about 1 hour at 120° C., the solution was analyzed and it was found that no 1-chloropentane had been eluted.

EXAMPLE IV

A run was carried out to see if a lower molecular weight haloalkane could be employed to elute a higher molecular weight haloalkane from a molecular sieve.

In this run, 1-chlorobutane was employed for the elution of 1-chloropentane from a 5A molecular sieve.

In this run, a mixture of 10 grams 1-chloropentane and 40 grams cyclopentane was added to 50 grams 5A molecular sieve. Analysis of the feedstock showed 19 percent 1-chloropentane and 81 percent cyclopentane. After standing overnight, the liquid above the sieve was analyzed by GLC and found to contain 7.6 percent by weight 1-chloropentane, showing that 1-chloropentane was being adsorbed.

The sieve was filtered from the mixture, washed with cyclopentane, and 24 grams of 1-chlorobutane was added to the sieve. The resulting mixture of liquid and sieve was shaken, and a sample of the liquid was taken. GLC analysis of this liquid indicated 2.7 weight percent 1-chloropentane and 52.3 weight percent 1-chlorobutane. This shows some elution was taking place. One hour later, the liquid analyzed 3.5 weight percent 1-chloropentane and 50.1 weight percent 1-chlorobutane. After standing over the weekend (2 days) the liquid above the sieve analyzed 9.4 weight percent 1-chloropentane and 42.4 weight percent 1-chlorobutane.

Said liquid was drained from the sieve and the sieve was washed three times with cyclopentane, then 30 grams of 1-chloropentane was added to the sieve to see if reverse displacement would occur. The liquid was sampled immediately after addition and analyzed 3.1 weight percent 1-chlorobutane and 79.4 weight percent 1-chloropentane. After 3½ hours, the liquid analyzed 6.2 weight percent 1-chlorobutane and 60.2 weight percent 1-chloropentane. After 18 hours total, the liquid analyzed 7.6 weight percent 1-chlorobutane and 60.1 weight percent 1-chloropentane.

EXAMPLE V

A run was carried out to determine if methylene chloride would displace a higher molecular weight haloalkane from a 5A molecular sieve.

In this run, a mixture of 10 grams of 1-chloropentane and 40 grams of cyclopentane was added to 50 grams of 5A molecular sieve. After standing overnight the sieve was drained, filtered, washed with cyclopentane, and to this sieve was added 40 grams of methylene chloride. The mixture was then shaken for about 2 minutes and a sample taken immediately. The liquid above the sieve analyzed 1.1 weight percent 1-chloropentane and 61.8 weight percent methylene chloride. One hour later, the liquid analyzed 7.3 weight percent 1-chloropentane and 47.9 weight percent methylene chloride. After standing over the weekend, the solution analyzed 9.7 weight percent 1-chloropentane and 46.0 weight percent methylene chloride, definitely showing that elution was taking place.

Reverse displacement was carried out by adding 30 grams of 1-chloropentane to the sieve after draining said liquid from the sieve and washing it with cyclopentane. The liquid was sampled immediately after addition of 1-chloropentane and analyzed 4.2 weight percent methylene chloride and 76.5 weight percent 1-chloropentane. After standing overnight, the solution analyzed 12.4 weight percent methylene chloride and 54.6 weight percent 1-chloropentane.

EXAMPLE VI

A run was carried out according to the process of this invention in which 1-chlorododecane was adsorbed on a 5A molecular sieve and then eluted with 1-chloroheptane.

In this run, 33.7 grams of a mixture formed from 15 grams of 1-chlorododecane and 40 grams of cyclopentane was added to 47 grams of 5A molecular sieve and allowed to stand for 16 hours at 25° C. The molecular sieve was weighed and found to have gained 7 grams in weight. 46 grams of loaded sieve was then charged to a jacketed tube and heated to 125° C. while pumping 1-chloroheptane through the loaded sieve. Six 25 ml. cuts were taken of the overflowing material which was overflowing at the pumping rate of 1 ml. per minute. The first cut taken, amounting to 22 grams, analyzed 1.7 weight percent cyclopentane, 91.2 weight percent 1-chloroheptane, and 6.4 weight percent 1-chlorododecane. This illustrates displacement of a primary haloalkane by a lower molecular weight primary alkyl halide.

EXAMPLE VII

Another run is carried out according to the process of this invention wherein benzene is alkylated with chlorinated paraffins in the presence of aluminum chloride-hydrocarbon complex catalyst to prepare a detergent grade alkylate and primary chloroparaffins. The operating conditions employed in the various processing steps are within the preferred ranges set forth above for said steps.

In this run, a n-paraffin concentrate having the following composition is utilized:

Paraffin analysis

| | Wt. percent |
|---|---|
| Lighter than $C_{13}$ | 1.7 |
| n-$C_{13}$ | 27.0 |
| n-$C_{14}$ | 47.0 |
| n-$C_{15}$ | 24.0 |
| Non-normal paraffins | 0.3 |

Average molecular weight=197.

This n-paraffin concentrate is chlorinated to form a chlorinated paraffin-paraffin mixture containing approximately 20 mol percent monochloroparaffins. Of the chlorinated paraffins present, approximately 12 to 15 mol percent comprises primary monochloroparaffins. Said primary monochloroparaffins are essentially completely removed from said mixture by contacting same with a Linde 5A molecular sieve which has previously been eluted with 1-chloroheptane. Said contacting is carried out at a weight ratio of said mixture to molecular sieve of about 1:5, a temperature of about 30° C., and a contacting time of about 16 hours. The loaded molecular sieve is separated from the treated mixture and eluted with 1-chloroheptane at a temperature of 125° C. A mixture of primary $C_{13}$ to $C_{15}$ monochloroparaffins, having a purity of at least 95 weight percent is then separated from the eluent-chloroparaffin mixture by distillation.

Benzene is then alkylated with the unadsorbed secondary chloroparaffins by charging 450 grams benzene, 2500 grams aluminum chloride-hydrocarbon complex catalyst, and 1150 grams of said secondary chloroparaffins to a stainless steel reactor and heating to about 95° F. for 0.25 hour at autogenous pressure. The catalyst and hydrocarbon phases are then separated after cooling the mixture. The hydrocarbon phase is then fractionated to separate unreacted benzene, unreacted chloroparaffins, paraffins, and product alkylate. It is found that essentially all of the secondary chloroparaffins alkylated with benzene and said product alkylate contains only a trace of chlorine.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. A process for the selective removal of a straight chain primary haloalkane from a mixture comprising said primary haloalkane and a straight chain secondary haloalkane containing the same type of halogen as said primary haloalkane, said haloalkanes being selected from the group consisting of monochloroalkanes and monobromoalkanes containing from 3 to 25 carbon atoms per molecule, which process comprises: contacting said mixture in a contacting zone with a crystalline zeolitic molecular sieve material of selectively adsorbing said primary haloalkane and having pore diameters of about 5 Angstroms and selectively adsorbing at least a major portion of said primary haloalkane into said molecular sieve; said contacting being carried out at a temperature within the range of about 0 to about 100 C., a pressure within the range of from atmospheric to about 500 p.s.i.g., a contact time within the range of one minute to 72 hours, and employing a weight ratio of haloalkanes to molecular sieve within the range of 1:10 to 1:1; recovering unadsorbed haloalkane comprising said secondary haloalkane and having at least a substantially reduced primary haloalkane content from said contacting zone; eluting said molecular sieve employed in contacting said mixture with a straight chain primary haloalkane containing the same type of halogen and having a lower molecular weight than said adsorbed primary haloalkane to produce a second mixture comprising said eluent and said adsorbed primary haloalkane; said elution being carried out at a temperature within the range of from 25 to 175° C., a pressure within the range of from atmospheric to about 500 p.s.i.g., with an eluent to molecular sieve weight ratio within the range of from 1:1 to 5:1, and for an elution time within the range of from 1 minute to 72 hours; and recovering said desorbed primary haloalkane from said second mixture.

2. A process for the selected removal of a straight chain primary haloalkane from a mixture comprising said primary haloalkane and a straight chain secondary haloalkane containing the same type of halogen as said primary haloalkane, said haloalkanes being selected from the group consisting of monochloroalkanes and monobromoalkanes containing from 3 to 25 carbon atoms per molecule, which process comprises: contacting said mixture in a contacting zone with a crystalline zeolitic molecular sieve material capable of selectively adsorbing said primary haloalkane and having pore diameters of about 5 Angstroms and selectively adsorbing at least a major portion of said primary haloalkane into said molecular sieve; said contacting being carried out at a temperature within the range of about 0 to about 100 C., a pressure within the range of from atmospheric to about 500 p.s.i.g., a contact time within the range of one minute to 72 hours, and employing a weight ratio of haloalkanes to molecular sieve within the range of 1:10 to 1:1; recovering unadsorbed haloalkane comprising said secondary haloalkane and having a substantially reduced primary haloalkane content from said contacting zone; continuing said contacting in said zone until said molecular sieve material is spent; thereafter regenerating said molecular sieve material by contacting same with an eluent consisting essentially of a straight chain primary haloalkane containing the same type of halogen and having a lower molecular weight than said adsorbed primary haloalkane so as to desorb said adsorbed primary haloalkane; said contacting with said eluent being carried out at a temperature within the range of from 25 to 175° C., a pressure within the range of from atmospheric to about 500 p.s.i.g., with an eluent to molecular sieve weight ratio within the range of from 1:1 to 5:1, and for an elution time within the range of from one minute to 72 hours; passing said desorbed primary haloalkane and said eluent to a separation zone; in said separation zone, separating said desorbed primary haloalkane from said eluent; and withdrawing said desorbed primary haloalkane from said separation zone.

3. A process for the selective removal of a straight chain primary haloalkane from a mixture comprising said primary haloalkane and a straight chain secondary haloalkane containing the same type of halogen as said primary haloalkanes, said haloalkanes being selected from the group consisting of monochloroalkanes and monobromoalkanes containing from 3 to 25 carbon atoms per molecule, which process comprises: contacting said mixture in a contacting zone with a crystalline zeolitic molecular sieve material having pore diameters of about 5 Angstroms and selectively adsorbing at least a major portion of said primary haloalkane into said molecular sieve; said contacting being carried out at a temperature within the range of about 0 to about 100° C., a pressure within the range of from atmospheric to about 500 p.s.i.g., a contact time within the range of one minute to 72 hours, and employing a weight ratio of haloalkanes to molecular sieve within the range of 1:10 to 1:1; recovering unadsorbed haloalkane comprising said secondary haloalkane and having a substantially reduced primary haloalkane content from said contacting zone; continuing said contacting in said zone until said molecular sieve material is spent; thereafter regenerating said molecular sieve material by contacting same with an eluent consisting essentially of a straight chain primary haloalkane containing the same type of halogen and having a lower molecular weight than said adsorbed primary haloalkane so as to desorb said adsorbed primary haloalkane; said elution being carried out at a temperature within the range of from 25 to 175° C., a pressure within the range of from atmospheric to about 500 p.s.i.g., with an eluent to molecular sieve weight ratio within the range of from 1:1 to 5:1, and for an elution time within the range of from one minute to 72 hours; passing said desorbed primary haloalkane and said eluent to a separation zone; in said separation zone, separating said desorbed primary haloalkane from said eluent; recycling said separated eluent from said separation zone to said contacting zone; and withdrawing said desorbed primary haloalkane from said separation zone.

4. A process for the selective removal of a straight chain primary haloalkane from a mixture consisting essentially of said primary haloalkane and a straight chain secondary haloalkane continuing the same type of halogen as said primary haloalkane, said haloalkanes being selected from the group consisting of monochloroalkanes and monobromoalkanes containing from 10 to 15 carbon atoms per molecule, which process comprises: contacting said mixture in a contacting zone with a crystalline zeolitic molecular sieve material capable of selectively adsorbing said primary haloalkane and having pore diameters of about 5 Angstroms and selectively adsorbing at least a major portion of said primary haloalkane into said molecular sieve, said contacting being carried out at a temperature within the range of about 0 to about 100° C., a pressure within the range of from atmospheric to about 500 p.s.i.g., a contact time within the range of one minute to 72 hours, and employing a weight ratio of haloalkane to molecular sieve within the range of 1:10 to 1:1; recovering unadsorbed haloalkane comprising said secondary haloalkane and having at least a substantially reduced primary haloalkane content from said contacting zone; eluting said molecular sieve employed in contacting said mixture with a straight chain primary haloalkane containing the same type of halogen and having a lower molecular weight than said adsorbed primary haloalkane to produce a second mixture comprising said eluent and said adsorbed primary haloalkane; said elution being carried out at a temperature within the range of from 25 to 175° C., a pressure within the range of from atmospheric to about 500 p.s.i.g., with an eluent to molecular sieve weight ratio within the range of from 1:1 to 5:1, and for an elution time within the range of from one minute to 72 hours; and recovering said desorbed primary haloalkane from said second mixture.

5. A process for the selective removal of 1-chlorododecane haloalkane from a mixture consisting essentially of said 1-chlorododecane and 2-chlorododecane, which process comprises: contacting said mixture in a contacting zone with a crystalline zeolitic molecular sieve material capable of selectively adsorbing said 1-chlorododecane and having pore diameters of about 5 Angstroms and selectively adsorbing at least a major portion of said 1-chlorododecane into said molecular sieve, said contacting being carried out at a temperature within the range of about 0 to about 100° C., a pressure within the range of from atmospheric to about 500 p.s.i.g., a contact time within the range of one minute to 72 hours, and employing a weight ratio of haloalkanes to molecular sieve within the range of 1:10 to 1:1; recovering unadsorbed haloalkane comprising said 2-chlorododecane and having a substantially reduced 1-chlorododecane content from said contacting zone; continuing said contacting in said zone until said molecular sieve material is spent; thereafter regenerating said molecular sieve material by contacting same with an eluent consisting essentially of a straight chain primary haloalkane containing the same type of halogen and having a lower molecular weight than said adsorbed 1-chlorododecane so as to desorb said adsorbed 1-chlorododecane; said contacting with said eluent being carried out at a temperature within the range of from 25 to 175° C., a pressure within the range of from atmospheric to about 500 p.s.i.g., with an eluent to molecular sieve weight ratio within the range of from 1:1 to 5:1, and for an elution time within the range of from one minute to 72 hours; passing said desorbed 1-chlorododecane and said eluent to a separation zone; in said separation zone, separating said desorbed 1-chlorododecane from said eluent; and withdrawing said desorbed 1-chlorododecane from said separation zone.

References Cited

UNITED STATES PATENTS

| | | | |
|---|---|---|---|
| 2,340,654 | 2/1944 | Flett | 260—671 XR |
| 2,455,003 | 11/1948 | Frey | 260—683.4 |
| 2,644,018 | 6/1953 | Harper | 260—674 |
| 2,909,574 | 10/1959 | Woodle. | |
| 2,920,037 | 1/1960 | Haensel. | |
| 2,935,467 | 5/1960 | Fleck et al. | |
| 2,938,864 | 5/1960 | Fleck et al. | |
| 2,944,627 | 7/1960 | Skarstrom. | |
| 3,118,956 | 1/1964 | Feighner. | |
| 3,267,162 | 8/1966 | Bohl | 260—662 |
| 3,274,278 | 9/1966 | Kapur et al. | 260—671 |

OTHER REFERENCES

Barrer: J. Soc. Chem. Ind., May 1945, vol. 64, pp. 130–135, TP 136.

Suatoni: Analytical Chemistry, 1963, pp. 2196–2198.

Barrer: Chemical Society Annual Reports, XLI, 1944, pp. 31–46.

LEON ZITVER, *Primary Examiner.*

H. MARS, *Assistant Examiner.*

U.S. Cl. X.R.

260—671, 660, 659